M. C. MILLER.
KNIT FABRIC.
APPLICATION FILED AUG. 11, 1913.

1,210,345.

Patented Dec. 26, 1916.
7 SHEETS—SHEET 6.

WITNESSES:
H. D. McPhail
E. A. Cheney

INVENTOR.
Max C. Miller
BY
Phillips Van Everen & Fish
ATTORNEY.

M. C. MILLER.
KNIT FABRIC.
APPLICATION FILED AUG. 11, 1913.

1,210,345.

Patented Dec. 26, 1916.
7 SHEETS—SHEET 7.

WITNESSES:
N. D. McPhail
E. A. Cheney

INVENTOR.
Max C. Miller
BY
Phillips Van Everen & Fish
ATTORNEY.

UNITED STATES PATENT OFFICE.

MAX C. MILLER, OF PROVIDENCE, RHODE ISLAND, ASSIGNOR TO JENCKES KNITTING MACHINE COMPANY, OF PAWTUCKET, RHODE ISLAND, A CORPORATION OF RHODE ISLAND.

KNIT FABRIC.

1,210,345.  Specification of Letters Patent.  Patented Dec. 26, 1916.

Application filed August 11, 1913. Serial No. 784,235.

*To all whom it may concern:*

Be it known that I, MAX C. MILLER, a subject of the Emperor of Germany, residing at Providence, in the county of Providence and State of Rhode Island, have invented certain new and useful Improvements in Knit Fabrics; and I do hereby declare the following to be a full, clear, and exact description of the invention, such as will enable others skilled in the art to which it appertains to make and use the same.

The invention relates to a welted knit fabric and method of making the same.

The primary object of the invention is to provide a novel and improved welted fabric in which the turned edge of the welt is integrally united with the body fabric, and in which the welt may be knit and secured to the body fabric at the completion of the stocking or other fabric in which the welt is incorporated.

It is a further object of the invention to provide a novel and improved stocking having a closed toe and integrally united welt which may be completed by a continuous knitting operation, thereby avoiding the necessity for subsequent looping or sewing operations to close the toe or secure the edge of the welt to the body fabric of the leg.

To these ends the invention consists in the methods and the fabrics produced thereby hereinafter described and referred to in the claims.

The features of the invention will be readily understood from an inspection of the accompanying drawings and the following detailed description of the fabric and devices illustrated, and of the method of manipulating the devices to produce the fabric.

In the drawings, Figs. 3 to 6, and 24 and 25, are a series of diagrammatic views showing the method of forming a series of welt attaching loops about the leg of a stocking upon a spring needle, two-bank, straight knitting machine; Figs. 7, 8, 9, 26 and 27 are diagrammatic views showing the method of connecting the turned welt with the welt attaching loops; and Figs. 10 to 23, and 28 to 37, are a series of diagrammatic views showing the method of interlooping the selvage loops of the fabric.

Figures 1, 2:
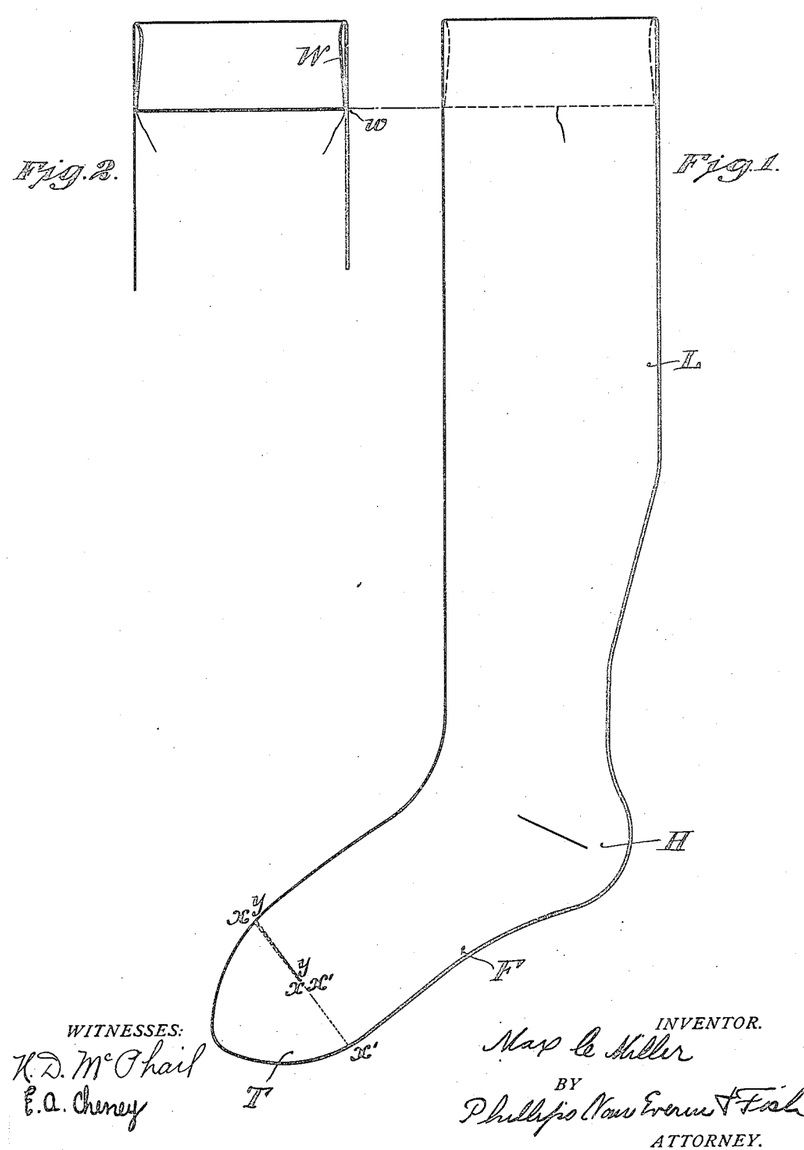
Figure 1 is a view showing a stocking embodying the features of the invention in their preferred forms.
Fig. 2 is a sectional view through the turned welt at the upper end of the leg of the stocking.

Two-bank straight knitting machines are well adapted for and have heretofore been used for knitting closed toe stockings either with or without fashioned feet or fashioned legs, and the welt and stocking of the present invention may be knit with commercial advantage upon machines of this type. In knitting a stocking embodying all the features of the invention in their preferred form upon a two-bank straight knitting machine, the toe, foot, heel and leg may be knit in the usual manner, as on the machine of the Nelson Patent No. 585,589. A setting-up course is formed on both banks of needles, the loops indicated at *x*—*x*, Fig. 1, being formed on the front bank, and the loops indicated at *y*—*y* being formed on the back bank. The front bank is then operated to knit the toe pouch or pocket T in the usual manner. When the toe is completed, the front bank holds the series of loops indicated at *x'*—*x'* along one side of the fabric, while the loops *y*—*y* along the other side of the fabric are still held by the back bank. The tubular fabric (either fashioned or unfashioned) forming the foot F is then knit on both banks. The heel H is then knit on a part of the needles at one end of each bank in the usual manner, after which the leg L is knit on the needles of both banks, needles at the heel ends of the banks being added in the usual manner if a fashioned leg is to be knit.

In knitting the welted fabric of the present invention, when that point *w* in the leg of the stocking at which the welt is to be secured to the body fabric is reached, a series of welt attaching loops are formed which extend about the fabric, and which are to be interlocked with loops of the welt after the welt fabric has been knit. In the preferred construction the welt attaching loops are formed in each needle wale, and all the loops are formed in the same course, although this arrangement is not essential. In knitting the stocking on a two-bank straight machine, the welt attaching loops may be formed and held during the knitting of the welt fabric, and then transferred to the needles by a series of loop retainers corresponding in number to the number of welt attaching loops which are to be formed. The loop retainers 1 shown in the drawings are formed of two contacting strips of sheet metal, and are provided at their ends with loop retaining hooks 2 and with loop guiding fingers 3. The strips forming the loop retainers are bent outward back of the hooks 3 to form eyes 4 for the passage of the needles, and the hook ends of the strips may spring apart to allow the needles to pass laterally between them. These devices are mounted so that they may be moved in the manner to be described, and may be actuated by any suitable mechanism.

Figure 3:
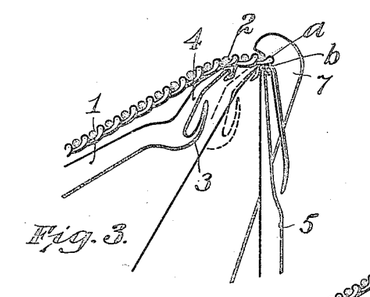
Figures 4, 7:
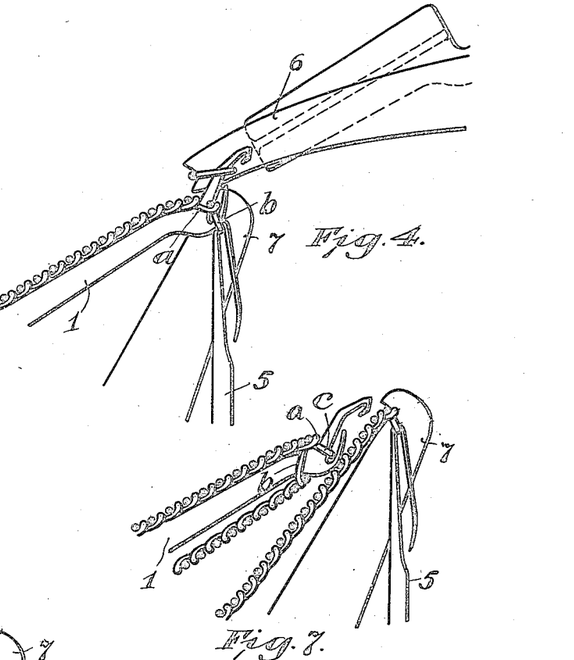
Figure 5:
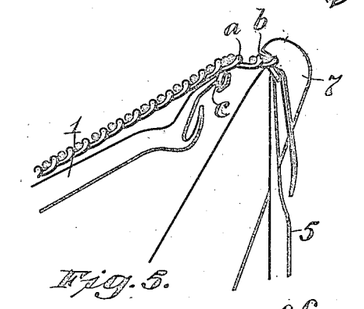
Figure 6:
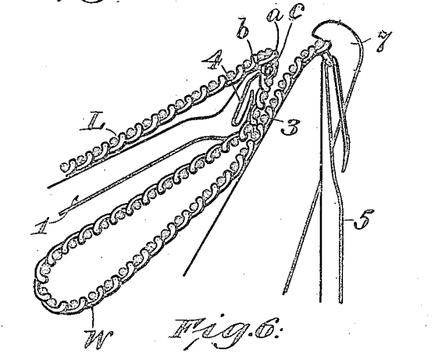
Figure 8:
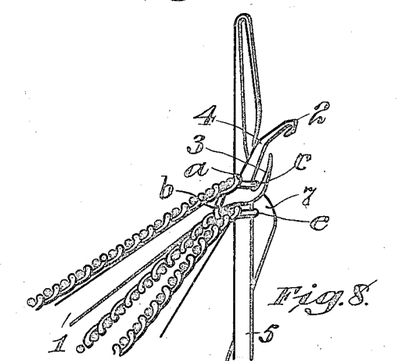
Figures 9, 10, 11, 12, 13, 14, 15, 16, 17:
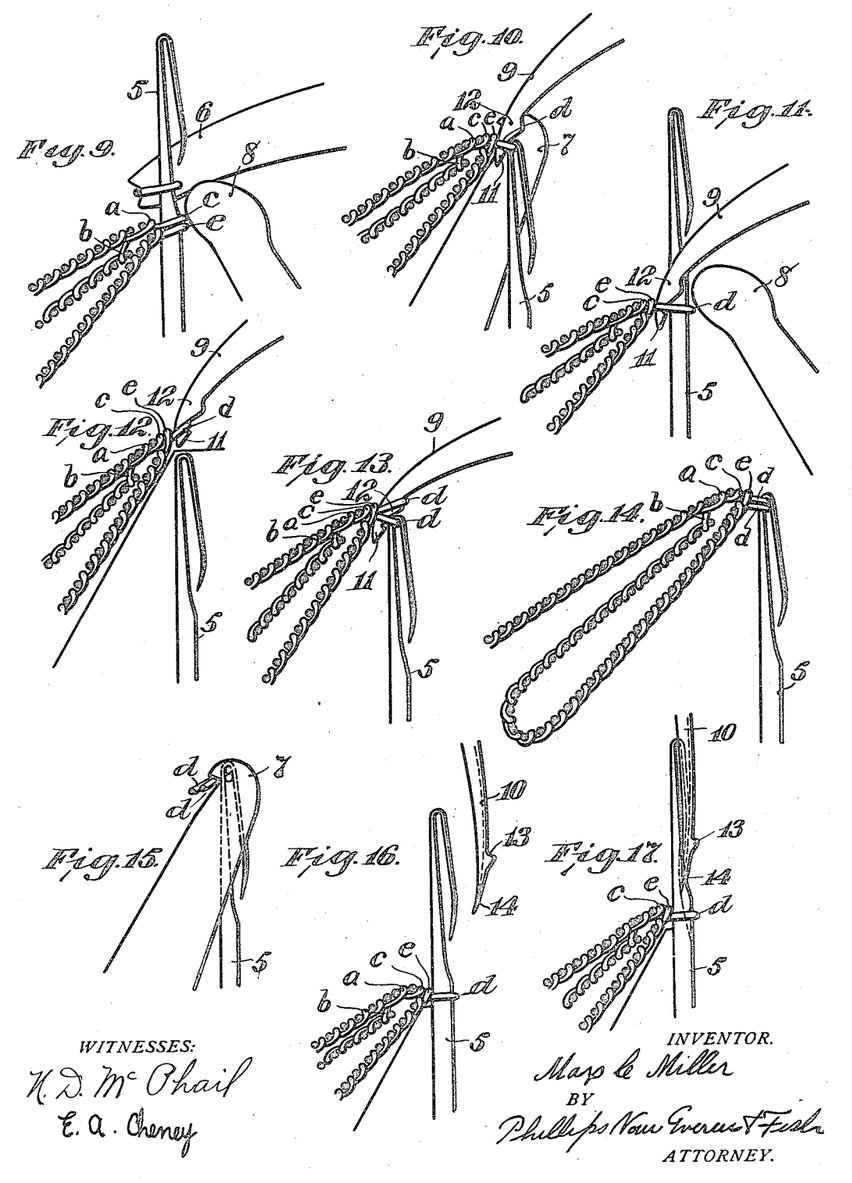
Figure 24:
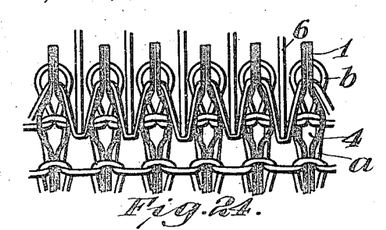
Figure 25:
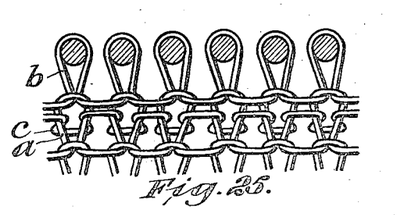
Figure 26:
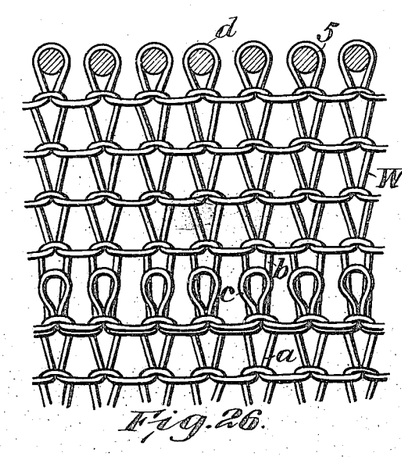
Figure 27:
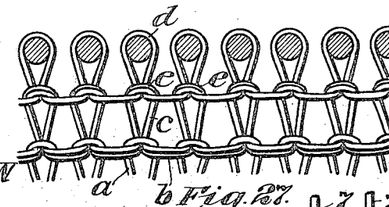

When the series of welt attaching loops are to be formed, the loop retainers 1 are moved forward from their inactive retracted position into the position indicated in full lines in Fig. 3, the loop retainers corresponding to each bank of needles lying inside the needles and outside the fabric, as indicated. Assuming that the needles of the front bank have been drawn down to draw their loops, as indicated in Fig. 3, all the loop retainers corresponding to the needles of the front bank move forward into the dotted line position, and are then thrust up through the loops $a$ of the course preceding the course of loops $b$ which are held by the needle, as indicated in Figs. 4 and 24. The yarn guide and sinkers 6 then operate to lay the yarn around the loop retainers, which at this time are taking the place temporarily of the needles 5. The loop retainers 1 are now drawn down through the loops $a$, thereby forming the loops $c$ which are to be later used in attaching the turned welt to the body fabric (Fig. 25). The loop retainers corresponding to the back bank are operated in the same way to complete the course of welt attaching loops, and thereafter the knitting upon both banks continues in the usual manner to form the welt fabric indicated at W in Fig. 6, which hangs down between the loop retainers and the needles. After the length of fabric required to form the turned welt has been knit, the loop retainers 1 are moved forward, while the body fabrics L and welt fabric W are held by suitable takeups, so that the hooks 2 and guides 3 pass through the loops $b$, as indicated in Fig. 6, the guides 3 serving to guide the loops $b$ over the welt attaching loops $c$. This will pass the welt attaching loops $c$ through the loops $b$ of the fabric, and bring the loops $c$ to the inside of the fabric (Figs. 6 and 26). It will also bring the loops $c$ into register with the eyes 4 of the loop retainers, so that the needles in passing up through the eyes of the loop retainers will also pass through the loops $c$. While the needles are down the loop retainers will be moved into position with the eyes 4 above the tops of the needles, and then the needles will be moved up through the eyes of the loop retainers and through the loops $c$, as indicated in Fig. 8. The loop retainers then withdraw to their retracted position, leaving the loops $c$ upon the needles, and the needles are moved down to draw these loops under the web holders 7, the beards remaining open. The needles are then raised and the yarn laid about them, as indicated in Fig. 9. They are then drawn down to draw the loops $d$ through the welt securing loops $c$, and through the loops $e$ of the previous course of the welt fabric, the beards being closed by the beard pressers 8, so that the loops $c$ and loops of the previous course of the welt fabric are cast off the needles (Fig. 27). The course of loops $d$ are thus drawn through the welt attaching loops and through the loops of the welt fabric, and act as locking loops to integrally unite the welt with the body fabric.

The locking loops, in case they form the end or selvage loops of the fabric, or the loops of the last course knit, in case a number of stitches are formed after the locking loops have been drawn through the welt securing loops, are interlooped or interlocked with each other to form a non-raveling edge or selvage. In the fabric shown the locking loops $d$ are also the selvage loops, and are interlooped or interlocked with each other by drawing the loop of the needle wale corresponding to the third needle from each end of each bank through the selvage loops of the wales corresponding to the first and second needles, then drawing the loop of the wale corresponding to the fifth needle through this loop and through the loop of the wale corresponding to the fourth needle, and continuing this interlocking of the loops toward the center of each bank until a single loop is finally drawn through the wale corresponding to the center needle and one of the other selvage loops. These single loops on each side of the fabric may then be tied or fastened in any suitable manner. In knitting the fabric upon a two-bank straight machine, these loops may be temporarily locked by moving the yarn guide to deliver the yarn leading from the end of the last course to the two center needles and drawing long loops of yarn through these selvage loops. When the yarn is severed, the end of one of these loops will be drawn through the selvage loop as the fabric falls or is drawn away from the needles, while the other long loop is disengaged from its needle and remains in the selvage loop. The final selvage loops and thread end are thus temporarily locked or secured until it is convenient to permanently secure them.

Figure 28:
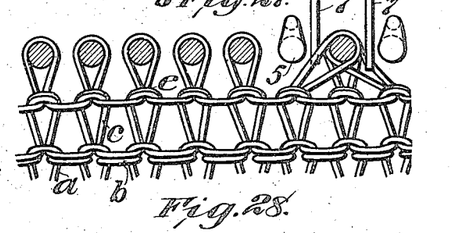

In interlocking the selvage loops of the fabric knit upon a two-bank straight machine, the selvage loops may be transferred and the needles operated in the manner illustrated in the drawings. As here shown, the loops are transferred from one needle to another by a transfer finger 9 and a transfer point 10 at each end of each bank of needles. The transfer finger 9 is of usual construction and is provided with a loop engaging hook 11 and an eye 12 back of the hook. The transfer point 10 is of usual construction, and is provided with a loop retaining shoulder 13 and with a point 14 which is adapted to press and close the beard of the needle. After the needles have drawn the loops $d$, the transfer fingers 9 are moved into position to pierce the loops $d$ held by the first needle of the front and rear bank, as indicated in Fig. 10. The end needles are then moved up into the position indicated in Fig. 11, and then drawn down into the position indicated in Fig. 12, the beard presser 8 operating to close the beard so that the loop is cast off the needle and transferred to the finger 9, as indicated in Fig. 12. The transfer finger is now moved up so that its point clears the top of the needle bed, and is shogged one needle toward the center, presenting its loop over the needle next to the end needle or the second needle. The transfer finger is now moved down to pierce the loop held by the second needle (Fig. 13), and the needle is moved up through the loop carried by the transfer finger, and is then moved down to draw the loop carried by the transfer finger under the beard of the needle, the beard remaining open during this stroke of the needle. The transfer finger then withdraws, leaving the loop on the needle, as indicated in Fig. 14, and the web holders 7 move in so that the web holder between the first and second needle holds down the two loops of the first and second needle webs, as indicated in Figs. 15 and 28.

Figures 18, 19, 20, 21, 22, 23:
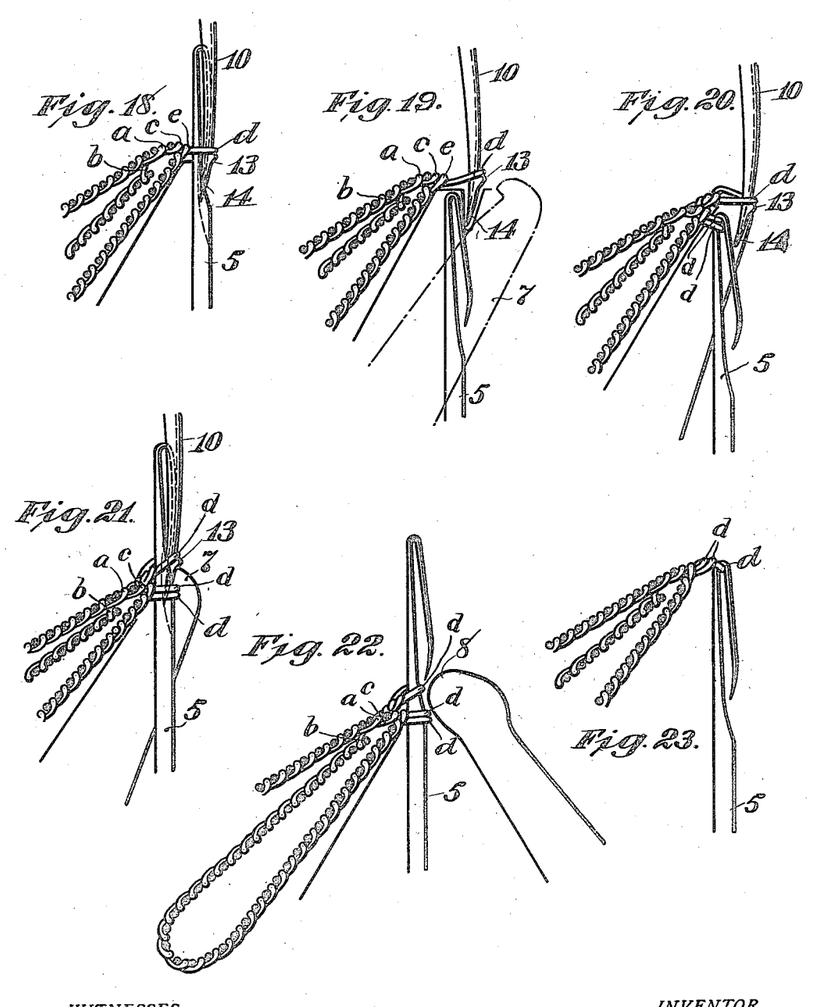
Figure 29:
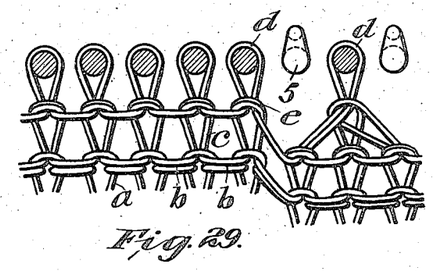
Figure 30:
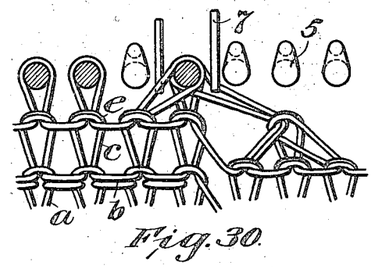
Figure 31:
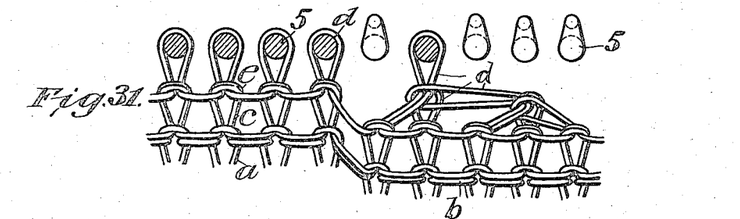
Figure 32:
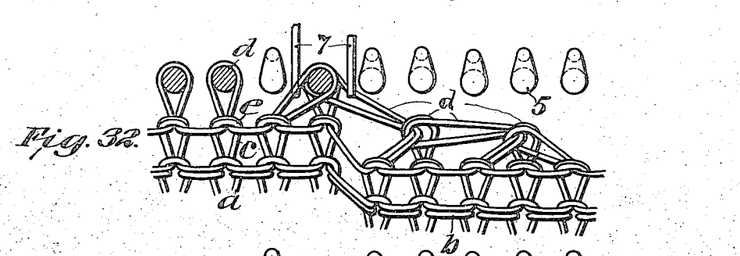
Figure 33:
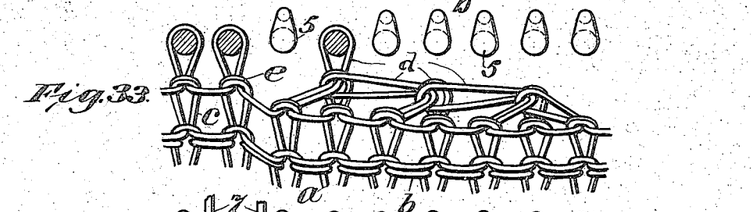
Figure 34:
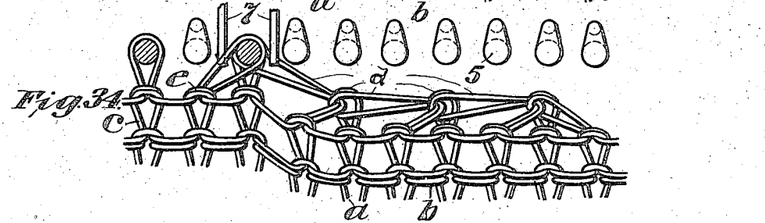
Figure 35:
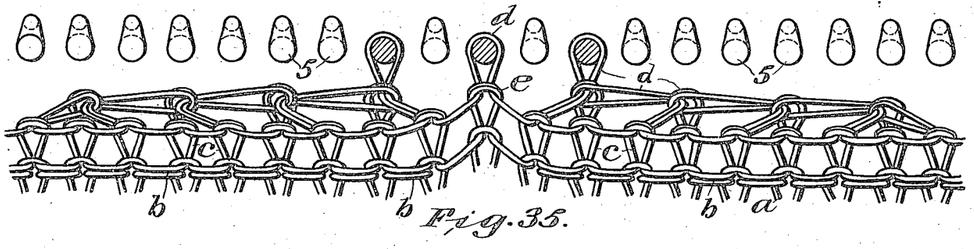
Figures 36, 38:
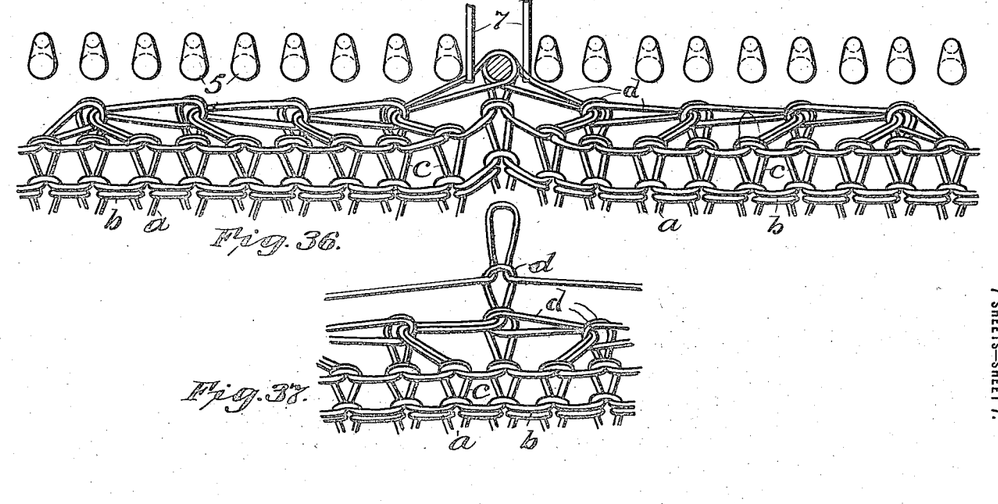

The selvage loop $d$ of the third needle wale is transferred to the second needle by the transfer point 10. This transfer is effected by raising the third needle into the position indicated in Fig. 16, engaging the transfer point with the beard of the needle, as indicated in Fig. 17, moving the needle and transfer point down, as indicated in Fig. 18 until the loop on the needle is engaged with the shoulder 13 of the transfer point, then continuing the movement of the needle to transfer the loop to the transfer point, as indicated in Fig. 19, then shogging the transfer point into position over the second needle, then raising the second needle through the loop carried by the transfer point, as indicated in Fig. 21, and then withdrawing the transfer point to transfer the loop to the needle. In transferring the loop to the needle, the transfer point 10 carries the loop over the nib of the web holder 7, so that the selvage loop $d$ of the third needle wale is spaced above the selvage loops $d$ of the first and second needle wales, as indicated in Figs. 22 and 28. The second needle is then drawn down, its beard passing over the loop $d$ of the third needle wale and then being closed by the beard presser 8, so that this loop is drawn down through the loops $d$ of the first and second needle wales, which are cast off the needle as indicated in Figs. 23 and 29. The transfer points 9 and transfer fingers 10 are then moved toward the center of the bank, and operate in a similar manner to transfer the loop $d$ of the third needle wale, which is now held by the second needle, to the fourth needle, and to transfer the loop $d$ of the fifth needle wale to the fourth needle, as indicated in Fig. 30. The loop $d$ of the fifth needle wale is then drawn through the loop $d$ of the third needle wale, and the loop $d$ of the fourth needle wale, as indicated in Fig. 31. The transfer finger and transfer point are then moved toward the center of the bank, and are operated to continue the transfer of the selvage loops $d$ of the needle wales, as indicated in Figs. 32 to 37 inclusive, until finally the selvage loops have been interlocked with each other, and a single loop $d$ is held by the center needle of each bank. To complete the securing of the selvage loops these final loops may be secured in any manner by knotting or fastening them about other loops of the fabric, or in any other suitable way, after the fabric is removed from the needles. The loose end of the yarn leading from the last course knit may also be tied or fastened to the fabric in any suitable way. This end and the final loops may be temporarily locked or held against displacement in the fabric in the manner already described.

This application relates to the same general subject matter of invention as is disclosed in applicant's copending application Ser. No. 784,234, filed Aug. 11, 1913.

Having explained the nature and object of the invention, and specifically described one form thereof, what is claimed is:—

1. A stocking comprising an integrally knit closed toe and a welt having a course of locking loops which pass through a course of welt attaching loops in the leg, and having its selvage loops interlocked.

2. A stocking comprising an integrally knit closed toe and a welt having a course of locking loops which pass through a course of welt attaching loops in the leg and are interlocked with each other.

3. A knit fabric having a turned welt attached to the body web by a course of loops which pass through a course of loops in the body web and are interlocked with each other.

4. A knit fabric having a turned welt attached to the body web by a course of loops engaging a course of loops in the body web and having its selvage loops interlocked with each other.

5. The method of knitting a stocking which consists in knitting a closed toe, foot, heel and leg, forming a course of welt attaching loops, knitting a welt web beyond the loops, knitting a course in the welt web through the course of welt attaching loops, and interlooping the selvage loops of the welt web.

6. The method of knitting a stocking which consists in knitting a closed toe, foot, heel and leg, forming a course of welt attaching loops, knitting the welt web beyond the loops, knitting a selvage course in the welt web through the course of welt attaching loops, and interlooping the selvage loops.

7. The method of knitting a welted fabric which consists in knitting a body web, forming a course of welt attaching loops, knitting a welt web beyond the loops, knitting a course in the welt web through the course of welt attaching loops, and interlocking the selvage loops of the welt web.

8. The method of knitting a welted fabric which consists in knitting a body web, forming a course of welt attaching loops, knitting a welt web beyond the loops, knitting a selvage course through the welt attaching loops, and interlooping the selvage loops.

9. The method of knitting a welted fabric which consists in knitting body and welt webs, knitting a course of the welt through a course in the body web, and interlocking the selvage loops with each other.

10. The method of knitting a welted fabric which consists in knitting body and welt webs, knitting a selvage course through a course in the body web, and interlooping the selvage loops.

MAX C. MILLER.

Witnesses:
H. D. McPhail,
E. A. Cheney.